US012777274B2

(12) United States Patent
Shintaku et al.

(10) Patent No.: US 12,777,274 B2
(45) Date of Patent: Oct. 27, 2026

(54) TRANSMISSION APPARATUS, PATH SETTING METHOD AND COMPUTER PROGRAM

(71) Applicant: NTT, Inc., Tokyo (JP)

(72) Inventors: Kengo Shintaku, Musashino (JP); Takuya Ohara, Musashino (JP); Fumikazu Inuzuka, Musashino (JP); Takuya Oda, Musashino (JP); Katsuaki Higashimori, Musashino (JP)

(73) Assignee: NTT, Inc., Tokyo (JP)

( * ) Notice: Subject to any disclaimer, the term of this patent is extended or adjusted under 35 U.S.C. 154(b) by 335 days.

(21) Appl. No.: 18/286,415

(22) PCT Filed: Apr. 21, 2021

(86) PCT No.: PCT/JP2021/016153

§ 371 (c)(1),
(2) Date: Oct. 11, 2023

(87) PCT Pub. No.: WO2022/224373

PCT Pub. Date: Oct. 27, 2022

(65) Prior Publication Data

US 2024/0187763 A1 Jun. 6, 2024

(51) Int. Cl.
*H04Q 11/00* (2006.01)
*H04B 10/27* (2013.01)

(52) U.S. Cl.
CPC ......... *H04Q 11/0062* (2013.01); *H04B 10/27* (2013.01); *H04Q 2011/0064* (2013.01); *H04Q 2011/0086* (2013.01)

(58) Field of Classification Search
CPC ....... H04Q 11/0062; H04Q 2011/0064; H04Q 2011/0086; H04B 10/27
See application file for complete search history.

(56) References Cited

U.S. PATENT DOCUMENTS

| | | | | |
|---|---|---|---|---|
| 10,079,641 | B1 * | 9/2018 | Chen | H04L 12/56 |
| 10,257,596 | B2 * | 4/2019 | Swinkels | H04B 10/516 |
| 10,972,209 | B2 * | 4/2021 | Barnard | H04L 45/28 |
| 11,838,048 | B2 * | 12/2023 | Rao | H04J 14/0295 |
| 12,652,601 | B2 * | 6/2026 | Zheng | H04W 40/12 |

(Continued)

FOREIGN PATENT DOCUMENTS

| | | |
|---|---|---|
| JP | 2012-165334 A | 8/2012 |
| JP | 2012-209839 A | 10/2012 |

OTHER PUBLICATIONS

Kengo Shintaku et al, "Trends in Standardization of Mapping and Multiplexing Technologies for Optical Transport Networks", NTT Technical Review, vol. 18, No. 12, Dec. 2020, <URL: https://www.ntt-review.jp/archive/ntttechnical.php?contents=ntr202012gls.html>.

*Primary Examiner* — David C Payne

(57) ABSTRACT

A transmission device, which is provided between user devices and transmits a client signal transmitted by the user devices through an optical transmission network, the transmission device comprising: a setting unit of setting a path having a band for accommodating the client signal obtained from a monitoring result of a control signal transmitted and received at a time of negotiation between the user devices; and a transfer unit of transferring the client signal using the path set by the setting unit.

8 Claims, 16 Drawing Sheets

(56) References Cited

U.S. PATENT DOCUMENTS

| | | | | |
|---|---|---|---|---|
| 2011/0293266 | A1* | 12/2011 | Aoki | H04B 10/5161<br>398/25 |
| 2015/0098702 | A1* | 4/2015 | Togo | H04L 12/6418<br>398/66 |
| 2023/0232487 | A1* | 7/2023 | Freda | H04W 76/23<br>455/11.1 |

* cited by examiner

TRANSMISSION APPARATUS, PATH SETTING METHOD AND COMPUTER PROGRAM

CROSS-REFERENCE TO RELATED APPLICATIONS

This application is a 371 U.S. National Phase of International Application No. PCT/JP2021/016153, filed on Apr. 21, 2021. The entire disclosure of the above application is incorporated herein by reference.

TECHNICAL FIELD

The present invention relates to a transmission apparatus, a path setting method and a computer program.

BACKGROUND ART

Conventionally, in order to realize long-distance and large-capacity optical communication, an optical transmission standard called an OTN (Optical Transport Network) has been proposed (see, for example, NPL 1). In general, it is necessary that the transmission capacity of an optical data unit (ODU) path between transmission device constituting an optical transmission network is uniquely set in advance. On the other hand, there are types of USB (Universal Serial Bus) and video signal (for example, HDMI (High-Definition Multimedia Interface)/DisplayPort or the like) (HDMI is a registered trademark, the same applies hereinafter) for which the transmission rate is determined on the basis of the results of negotiation between the source device and sink device. For example, when a personal computer and a display device are connected, the resolution (≈transmission rate) that both the personal computer and the display device correspond to is determined based on the negotiation.

CITATION LIST

Non Patent Literature

[NPL 1] Kengo Shintaku, et al., "Trends in Standardization of Mapping and Multiplexing Technologies for Optical Transport Networks", NTT Technical Review, Vol. 18 No. 12, December 2020, <URL: https://www.ntt-review.jp/archive/ntttechnical.php?cootnts=ntr202012gls.html>

SUMMARY OF INVENTION

Technical Problem

When the above-described signal is accommodated in the ODU path, the transmission capacity of the ODU path between the transmission devices is not appropriate, and may be excessive or insufficient. If the transmission capacity is insufficient, for example, in the case of a video signal, a video image is not projected on a sink device (for example, a display device). As a result, communication carriers need to change the setting of the ODU path of the transmission device, and there is a problem that the rapid signal communication is inhibited. Such a problem occurs in a signal type in which a transmission rate is determined based on a result of negotiation between a source device and a sink device.

In view of the above circumstances, the purpose of this invention is to provide a technology that enables prompt signal communication by reducing the effort required by communication carriers to change a setting of the transmission device.

Solution to Problem

One aspect of the present invention relates to a transmission device, which is provided between user devices and transmits a client signal transmitted by the user devices through an optical transmission network, includes a setting unit of setting a path having a band for accommodating the client signal obtained from a monitoring result of a control signal transmitted and received at a time of negotiation between the user devices and a transfer unit of transferring the client signal using the path set by the setting unit.

One aspect of the present invention relates to a path setting method in a transmission device provided between user devices and transmits a client signal transmitted by the user devices through an optical transmission network, includes setting a path having a band for accommodating the client signal obtained from a monitoring result of a control signal transmitted and received at a time of negotiation between the user devices and transferring the client signal using the set path.

One aspect of the present invention relates to a computer program causing a computer to function as a transmission device, which is provided between user devices and transmits a client signal transmitted by the user devices through an optical transmission network, includes a setting step of setting a path having a band for accommodating the client signal obtained from a monitoring result of a control signal transmitted and received at a time of negotiation between the user devices and a transfer step of transferring the client signal using the path set by the setting step.

Advantageous Effects of Invention

According to the present invention, it is possible to reduce labor required for changing the setting of the transmission device by the communication carrier and to perform rapid signal communication.

DESCRIPTION OF EMBODIMENTS

An embodiment of the present invention will be described below with reference to the drawings.

Overview

In the transmission system of the present invention, a control signal transmitted for negotiation between client devices is monitored by a part or all of two or more transmission devices provided between the client devices. Two or more transmission devices provided between the client devices set a transmission rate of an ODU path obtained on the basis of the monitoring result. That is, two or more transmission devices provided between the client devices set a path having a band for accommodating a client signal. Thus, when the client device is connected to the transmission device, the band of the ODU path suitable for signal communication can be automatically set. Therefore, the setting change of the ODU path of the transmission device by the communication carrier is not required, and prompt signal communication is enabled.

Hereinafter, a specific configuration for realizing the above-described processing will be described.

First Embodiment

Figure 1:
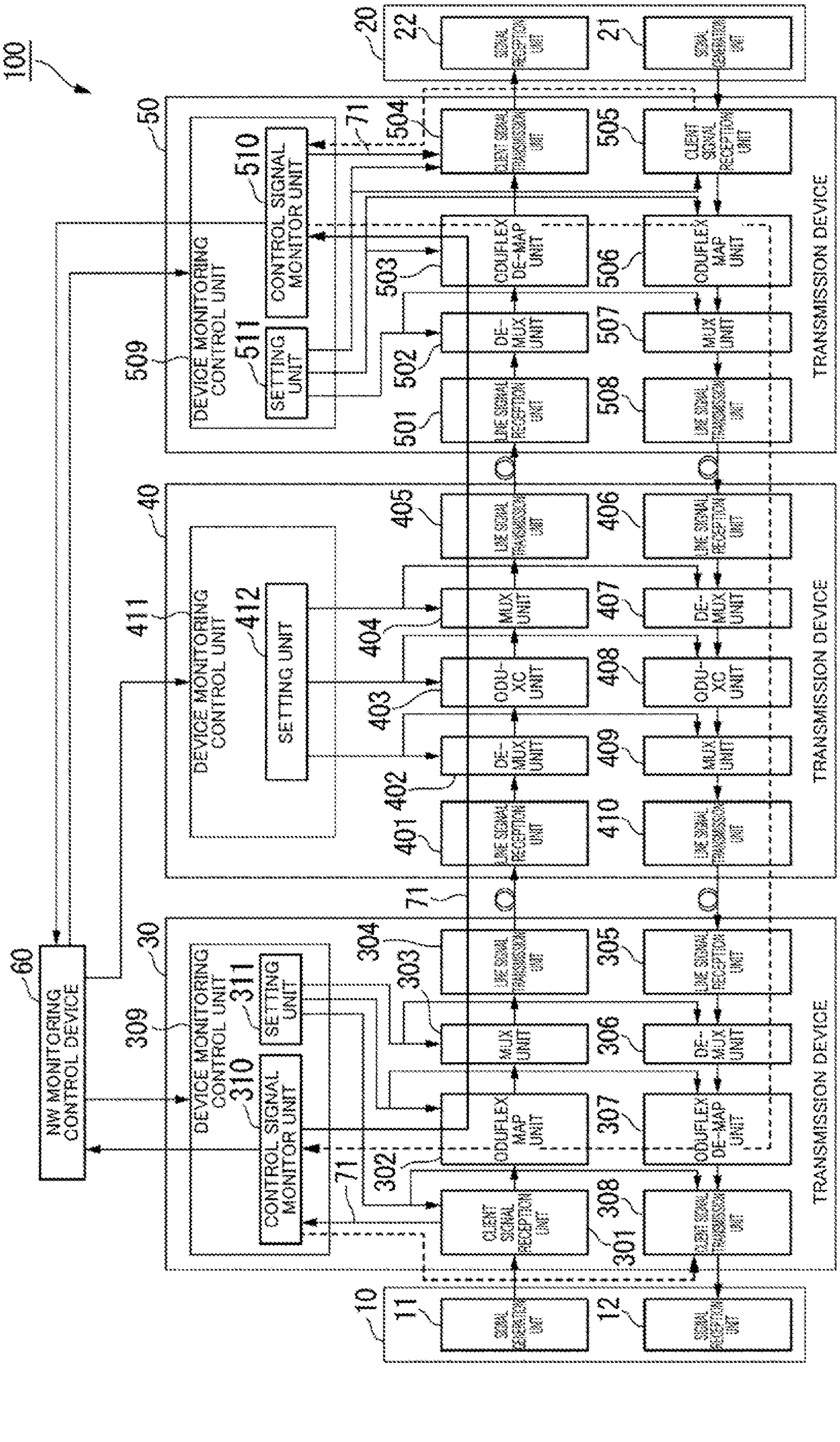
FIG. 1 is a diagram showing a configuration of a transmission system according to a first embodiment.

FIG. 1 is the diagram showing the configuration of the optical transmission system 1 according to a first embodiment. A transmission system 100 includes a user device 10, a user device 20, a transmission device 30, a transmission device 40, a transmission device 50 and a NW monitoring control device 60 are provided. A plurality of transmission devices 30, 40 and 50 is provided between the user device 10 and the user device 20. The transmission devices 30, 40, and 50 constitute an OTN. The transmission devices 30, 40, and 50 are connected by optical fibers.

Although FIG. 1 illustrates a configuration in which the transmission system 100 includes 3 transmission devices 30, 40, and 50, the transmission system 100 may include at least 2 transmission devices and may include 4 or more transmission devices.

In FIG. 1, a solid line 71 shows a flow of a control signal transmitted from the user device 10 to the user device 20. In FIG. 1, a dotted line shows a flow of a control signal transmitted from the user device 20 to the user device 10. The control signal is a signal used for negotiation between user device 10 and user device 20.

The interface between the user device 10 and the user device 20 may be either USB or HDMI, or other interfaces. In the following description, a signal transmitted by USB or HDMI will be described as an example of client signals, but the client signal is not limited to the above, and any signal type may be used as long as the transmission rate is determined based on the result of negotiation between the user device 10 and the user device 20.

Hereinafter, as an example, it is assumed that the user device 10 is a personal computer, and the user device 20 is a display device. In this case, the user device 10 transmits a video signal as a client signal.

The user device 10 includes a signal generation unit 11 and a signal reception unit 12. A signal generation unit 11 generates a client signal and a control signal. The signal reception unit 12 receives a signal (for example, a client signal or a control signal) transmitted from the user device 20 and transmitted via the transmission devices 30, 40 and 50.

The user device 20 includes a signal generation unit 21 and a signal reception unit 22. The signal generation unit 21 generates a client signal. A signal reception unit 22 receives a signal (for example, a client signal or a control signal) transmitted from the user device 10 and transmitted through the transmission devices 30, 40 and 50.

The transmission devices 30, 40 and 50 transmit signals transmitted between the user device 10 and the user device 20. The transmission device 30 is directly connected to the user device 10 via a physical line. The transmission device 50 is directly connected to the user device 20 via a physical line. Each of the transmission devices 30 and 50 monitors the control signal transmitted front the user device 10 or 20, and notifies the NW monitoring control device 60 of the monitoring result. The transmission device 40 is provided, for example, between the transmission device 30 and the transmission device 50, and transmits a signal transmitted from the transmission device 30 or the transmission device 50 to another transmission device.

The NW monitoring control device 60 controls the transmission devices 30, 40 and 50. For example, the NW monitoring control device 60 transmits a path setting request to the transmission devices 30, 40 and 50 to set the path in the transmission devices 30, 40 and 50. For example, the NW monitoring control device 60 determines the transmission rates and transmission systems of the transmission devices 30, 40 and 50 on the basis of the monitoring results transmitted from the transmission device-s 30 and 50. The NW monitoring control device 60 controls the transmission rates of the transmission devices 30, 40 and 50 by transmitting a change request for changing the determined transmission rate and the transmission system to the transmission devices 30, 40 and 50.

The transmission device 30 includes a client signal reception unit 301, an ODUflexMap unit 302, a Max unit 303, a line signal transmission unit 304, a line signal reception unit 305, a De-Mux unit 306, an ODUflexDe-Map unit 307, a client signal transmission unit 308, and a device monitoring control unit 309.

The client signal reception unit 301 receives a signal (for example, a control signal or a client signal) transmitted from the user device 10.

An ODUflexMap unit 302 stores the signal received by the client signal reception unit 301 in an ODUflex defined by G.709.

A Mux unit 303 performs time division multiplex one or more ODUflex on a faster ODU. The process performed by the Mux unit 303 is defined in G.709.

A line signal transmission unit 304 converts the ODU time-division multiplexed by the Mux unit 303 into an optical signal and transmits the optical signal.

A line signal reception unit 305 receives the ODU transmitted from another transmission device (for example, a transmission device 40).

A De-Mux unit 306 separates one or more ODUflex from the ODU received by the line signal reception unit 305.

An ODUflexDe-Map unit 307 extracts a signal (control signal or client signal) from the ODUflex separated by the De-Mux unit 306.

A client signal transmission unit 308 transmits the client signal extracted by the ODUflexDe-Map unit 307 or the control signal output from the device monitoring control unit 309 to the user device 10.

A device monitoring control unit 309 handles a command from the NW monitoring control device 60 and controls the transmission device 30. A device monitoring control unit 309 manages and monitors the state of each function in the transmission device 30, and notifies an NW monitoring control device 60 when there is abnormality.

The device monitoring control unit 309 includes a control signal monitor unit (control signal monitor) 310, and a setting unit (setter) 311. The control signal monitor unit 310 monitors a control signal transmitted in the transmission device 30. For example, the control signal monitor unit 310 monitors a signal received by the client signal reception unit 301 to acquire a control signal. For example, the control signal monitor unit 310 monitors the signal extracted by the ODUflexDe-Map unit 307 and acquires a control signal.

The setting unit 311, in response to an instruction from an NW monitoring control device 60, includes a client signal reception unit 301, an ODUflexMap unit 302, a Mux unit 303. Parameters of a De-Mux unit 306, an ODUflexDe-Map unit 307, and a client signal transmission unit 308 are set. For example, the setting unit 311 adjusts the band of the ODU by any one of the following methods after the NW monitoring control device 60 determines the transmission rate of the client signal. Here, the object of adjustment is the encoding method of the client signal, the band of the client signal, the band of the ODUflex containing the client signal, and the number of TSs (Tributary Slots) used when time division multiplex is performed into a high-speed ODU frame. The number of TSs is calculated on the basis of information on a band of ODUflex and a transmission speed of a line signal. An existing method described in ITU-T G.709 is used for calculating the number of TSs.

There are the following two methods to adjust the band of ODUs.

Method 1) For both ODUflex and the number of TSs, setting of the transmission device is once deleted and reset.

Method 2) Using the Hitless adjustment of ODUflex (GFP) as defined in ITU-T G, 7044.

According to any of the above methods, a setting unit 311 sets an encoding method of the client signal and a band of the client signal to a client signal reception unit 301 and a client signal transmission unit 308, and sets, to an ODUflexMap unit 302 and an ODUflexDe-Map unit 307, an ODUflex rate is set. The setting unit 311 sets the number of TSs to the Mux unit 303 and the De-Mux unit 306.

The transmission device 40 includes a line signal reception unit 401, a De-Mux unit 402, an ODU-XC unit 403, a Mux unit 404, a line signal transmission unit 405, a line signal reception unit 406, a De-Mux unit 407, an ODU-XC unit 408, a Mux unit 409, a line signal transmission unit 410, and a device monitoring control unit 411.

A line signal reception unit 401 receives the ODU transmitted from another transmission device (for example, a transmission device 30).

A De-Mux unit 402 separates one or more ODUflex from the ODU received by the line signal reception unit 401.

An ODU-XC unit 403 performs cross-connect (switching) of one or more ODUflex separated by the De-Mux unit 402.

A Mux unit 404 performs time division multiplex one or more ODUflex on a faster ODU. The process performed by the Mux unit 404 is defined in G.709.

A line signal transmission unit 405 transmits the ODU time-division multiplexed by the Mux unit 404 to a transmission device 50.

A line signal reception unit 406 receives the ODU transmitted from another transmission device (for example, a transmission device 50).

A De-Mux unit 407 separates one or more ODUflex from the ODU received by the line signal reception unit 406.

The ODU-XC unit 408 performs the cross-connect (switching) of one or more ODUflex ODUs separated by the De-Mux unit 407.

A Mux unit 409 performs time division multiplex one or more ODUflex on a faster ODU. The process performed by the Mux unit 409 is defined in G.709.

A line signal transmission unit 410 transmits the ODU time-division multiplexed by the Mux unit 409 to a transmission device 30.

A device monitoring control unit 411 handles a command from the NW monitoring control device 60 and controls the transmission device 40. A device monitoring control unit 411 manages and monitors the state of each function in the transmission device 40, and notifies an NW monitoring control device 60 when there is abnormality.

The device monitoring control unit 411 includes a setting unit 412. The setting unit 412 sets parameters of the De-Mux unit 402, the ODU-XC unit 403, the Mux unit 404, the De-Mux unit 407, the ODU-XC unit 408, and the Mux unit 409 in accordance with an instruction front the NW monitoring control device 60. For example, the setting unit 412 adjusts the band of the ODU according to the method 1 or 2 described above after the NW monitoring control device 60 determines the transmission rate of the client signal.

According to the method 1 or 2 described above, the setting unit 412 sets the ODUflex rate to the ODU-XC unit 403 and the ODU-XC unit 408. For example, the setting unit 412 sets, to the De-Mux unit 402, the Mux unit 404, the De-Mux unit 407 and the Mux unit 409. The number of TSs is set.

The transmission device 50 includes a line signal reception unit 501, a De-Mux unit 502, an ODUflexDe-Map unit 503, a client signal transmission unit 504, a client signal reception unit 505, an ODUflexMap unit 506, a Mux unit 507, a line signal transmission unit 508, and a device monitoring control unit 509.

A line signal reception unit 501 receives the ODU transmitted from another transmission device (for example, a transmission device 40).

A De-Mux unit 502 separates one or more ODUflex from the ODU received by the line signal reception unit 501.

An ODUflexDe-Map unit 503 extracts a signal (control signal or client signal) from the ODUflex separated by the De-Mux unit 502.

A client signal transmission unit 504 transmits the client signal extracted by the ODUflexDe-Map unit 503 or the control signal output front the device monitoring control unit 509 to the user device 20.

The client signal reception unit 505 receives a signal (for example, a control signal or a client signal) transmitted from the user device 20.

An ODUflexMap unit 506 stores the signal received by the client signal reception unit 505 in an ODUflex defined by G.709.

A Mux unit 507 performs time division multiplex one or more ODUflex on a faster ODU. The process performed by the Mux unit 507 is defined in G.709.

A line signal transmission unit 508 converts the ODU time-division multiplexed by the Mux unit 507 into an optical signal and transmits the optical signal.

A device monitoring control unit 509 handles a command from the NW monitoring control device 60 and controls the transmission device 50. A device monitoring control unit 509 manages and monitors the state of each function in the transmission device 50, and notifies an NW monitoring control device 60 when there is abnormality.

The device monitoring control unit 509 includes a control signal monitor unit 510, and a setting unit 511. The control signal monitor unit 510 monitors a control signal transmitted in the transmission device 50. For example, the control signal monitor unit 510 monitors a signal received by the client signal reception unit 505 to acquire a control signal. For example, the control signal monitor unit 510 monitors the signal extracted by the ODUflexDe-Map unit 503 and acquires a control signal.

The setting unit 511 sets the parameters of the De-Mux unit 502, ODUflexDe-Map unit 503, client signal transmission unit 504, client signal reception unit 505, ODUflexMap unit 506 and Mux unit 507 in response to instructions from the NW monitoring control device 60. For example, the setting unit 511 adjusts the band of the ODU according to the above-described method 1 or 2 after the NW monitoring control device 60 determines the transmission rate of the client signal.

According to the above-described method 1 or 2, the setting unit 511 sets the encoding method of the client signal and the band of the client signal for the client signal transmission unit 504 and the client signal reception unit 505, and sets the ODUflex rate for the ODUflexDe-Map unit 503 and the ODUflexMap unit 506. For example, the setting unit 511 sets the number of TSs to the De-Mux unit 502 and the Mux unit 507.

Figure 2:
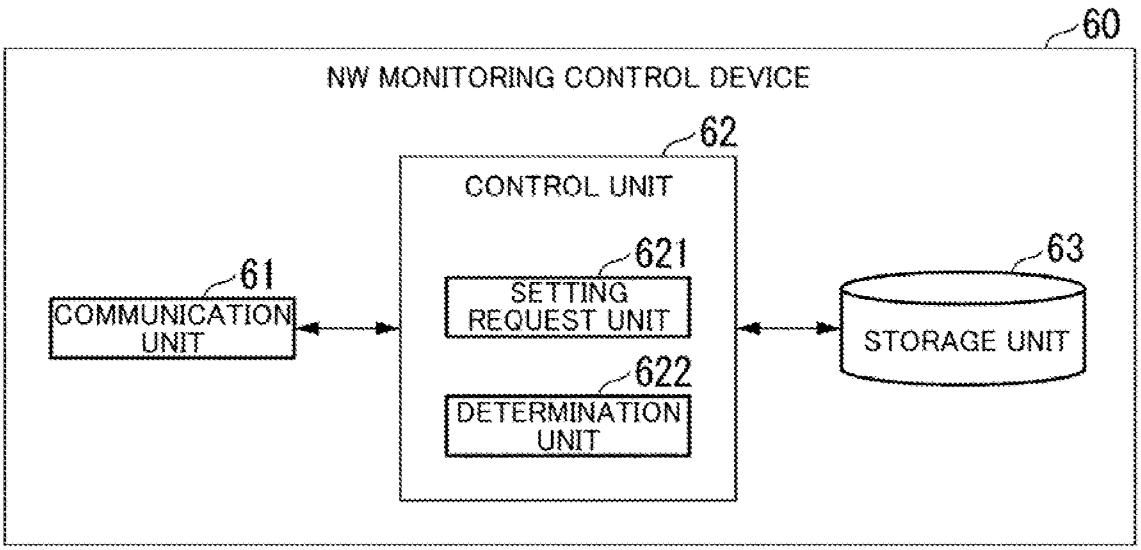
FIG. 2 is a diagram showing a configuration of a NW monitoring control device according to the first embodiment.

FIG. 2 is a diagram showing a configuration of the NW monitoring control device 60 according to the first embodiment. The NW monitoring control device 60 includes a communication unit 61, a control unit 62, and a storage unit 63.

The communication unit 61 is configured to include a communication interface for connecting the NW monitoring control device to an external device. The communication unit 61 communicates with the transmission devices 30, 40 and 50 by wire. For example, the communication unit 61 receives monitoring results from the transmission devices 30 and 50.

The control unit 62 controls the entire NW monitoring control device 60. The control unit 62 is configured using a processor such as a central processing unit (CPU) or a memory. The control unit 62 executes the program to implement the functions of the setting request unit 621 and the determination unit 622.

A setting request unit 621 requests the transmission devices 30, 40 and 50 to set a path.

A determination unit 622 determines a transmission rate and a transmission system to be set to the transmission devices 30, 40 and 50 on the basis of the monitoring result received by the communication unit 61.

The storage unit 63 is configured using a non-transitory computer-readable storage medium device such as a magnetic hard disk device or a semiconductor storage device. The storage unit 63 stores a control table. A monitoring result, a transmission rate and a transmission system are associated with the control table.

Next, the transfer method of control signals is described. Control signals may be multiplexed after encapsulating by IP (Internet Protocol) packets (RFC2460) and MAC (Media Access Control) frames (IEEE (Institute of Electrical and Electronics Engineers) 802.3), or GFP (Generic Framing Procedure) frames (ITU-T G.7041) and the like of PPP (Point-to-Point Protocol) (RFC (Request For Comments) 1661). The transmission devices 30 and 50 transfer the control signal by any one of the following methods 1 to 3. In the case of transferring the control signal by the method 3, the transmission devices 30 and 50 may directly perform bit mapping to the region.

(Control Signal Transfer Method 1)

The temporary ODU path is pre-stretched and accommodated in an ODU frame. Here, the temporary ODU path is a path set between the transmission devices 30, 40 and 50 before negotiation performed between the user device 10 and the user device 20. The band of the temporary ODU path is set as one parameter in the request from the NW monitoring control device 60, but any band may be used as long as the same band is set in all the transmission devices 30, 40 and 50. As one example, since the video signal of the HDMI 2.1 is desired to be transmitted, a path of 48 Gbps is set on the assumption of a signal type.

Figure 3:
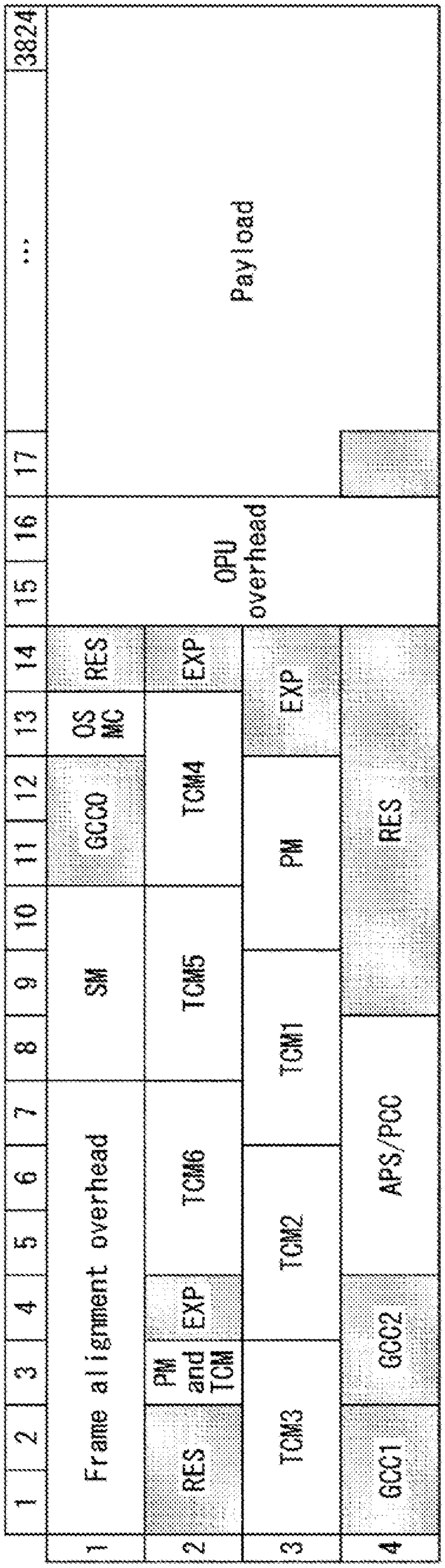
FIG. 3 is a diagram showing a first example of the arrangement of set values or the like contained in the ODU frame of the ITU-T recommendation G.709.
Figure 4:
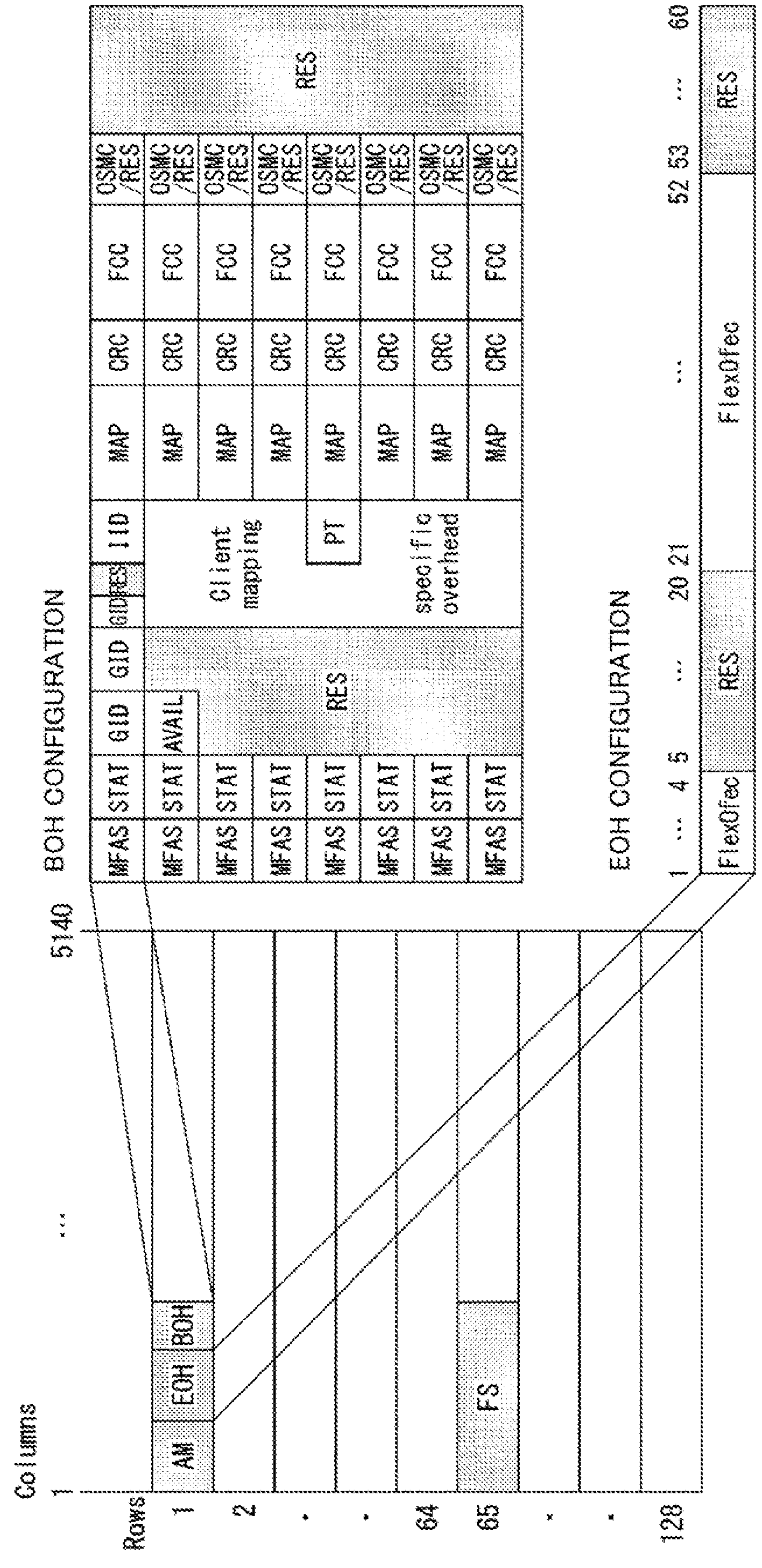
FIG. 4 shows a second example of the arrangement of set values or the like contained in the ODU frame of the ITU-T recommendation G.709.

In the case of accommodating the control signal in the ODU frame, the transmission devices 30 and 50 accommodate and transfer the control signal in the area indicated by the hatching in FIG. 3 or 4. FIG. 3 is a diagram showing a first example of the arrangement of the set values and the like contained in the ODU frame of the ITU-T recommendation G.709 ((OTUk (Optical Transport Unit k), OTUc (Optical Transport Unit c)). For example, a set value or the like is accommodated in a bit area indicated by a mesh in the definition of the ODU frame. Hem. “Payload” represents a payload region.

FIG. 4 is a diagram showing a second example of the arrangement of the set values and the like contained in the ODU frame of the ITU-T recommendation G.709.1 (FlexO). For example, set values and the like are accommodated in a bit area indicated by a mesh in the definition of the ODU frame shown in FIG. 3. Here, “OH” represents an overhead region. “FS” represents a “Fixed Stuff” region (fixed stuffing region).

(Control Signal Transfer Method 2)

Via Monitoring Control Network

Although not shown in FIG. 1, the transmission devices 30 and 50 are connected by another network (monitoring control network), and the transmission devices 30 and 50 transfer control signals via another network. In this case, the transmission device 30 transfers the control signal to the transmission device 50 via another network, and the transmission device 50 transfers the control signal to the transmission device 30 via another network.

(Control Signal Transfer Method 3)

Transfer is performed using a signal of another wavelength such as an OSC (Optical Supervisory Channel) specified by G.709

Next, a mapping method of client signals in the transmission devices 30 and 50 will be described. In mapping client signals to ODUflex, the following must be considered.

The client signal is generally transmission line coding.

Multi-lane transmission in which a plurality of physical signal lines is used in parallel is sometimes used. When the signal is accommodated in the ODUflex which is a serial signal, it is necessary to serialize the signal at the transmitting end and to multi-lane the signal at the receiving end.

In order to cope with the above, any one of the following methods is used to accommodate the client signal. Note that the processing is performed by accommodating OTNs such as Ethernet signals except for (1.2) shown below.

1. The client signal is regarded as a CBR (Constant Bit Rate) signal described in G.709, and accommodated in ODUflex using a GMP (General Mapping Procedure) or a BMP (Bit-synchronous Mapping Procedure). In this case, there are three methods (1.1) to (1.3) as the method.

(1.1): Serialization is performed while assigning a lane identifier (transcoding).

(1.2): The lane identifier is superimposed in the transmission line code.

(1.3): Lane re-order of all patterns is attempted without assigning the lane identifier (confirm whether decoding is possible by brute force).

2. Encapsulation is made as a non-CBR signal. In this case, there are two methods (2.1) to (2.2) as the method.

(2.1): The transmission line code is once released and encapsulated.

(2.2): The transmission line code is encapsulated as is.

As the encapsulation method, a GFP-f, a MAC frame, and an 1P packet are available.

The method described above will be specifically described with reference to FIGS. 5 to 10. Although FIGS. 5 to 10 show a multi-lane configuration, the present invention can be applied to a single lane.

(Mapping Method (1.1))

Figure 5:
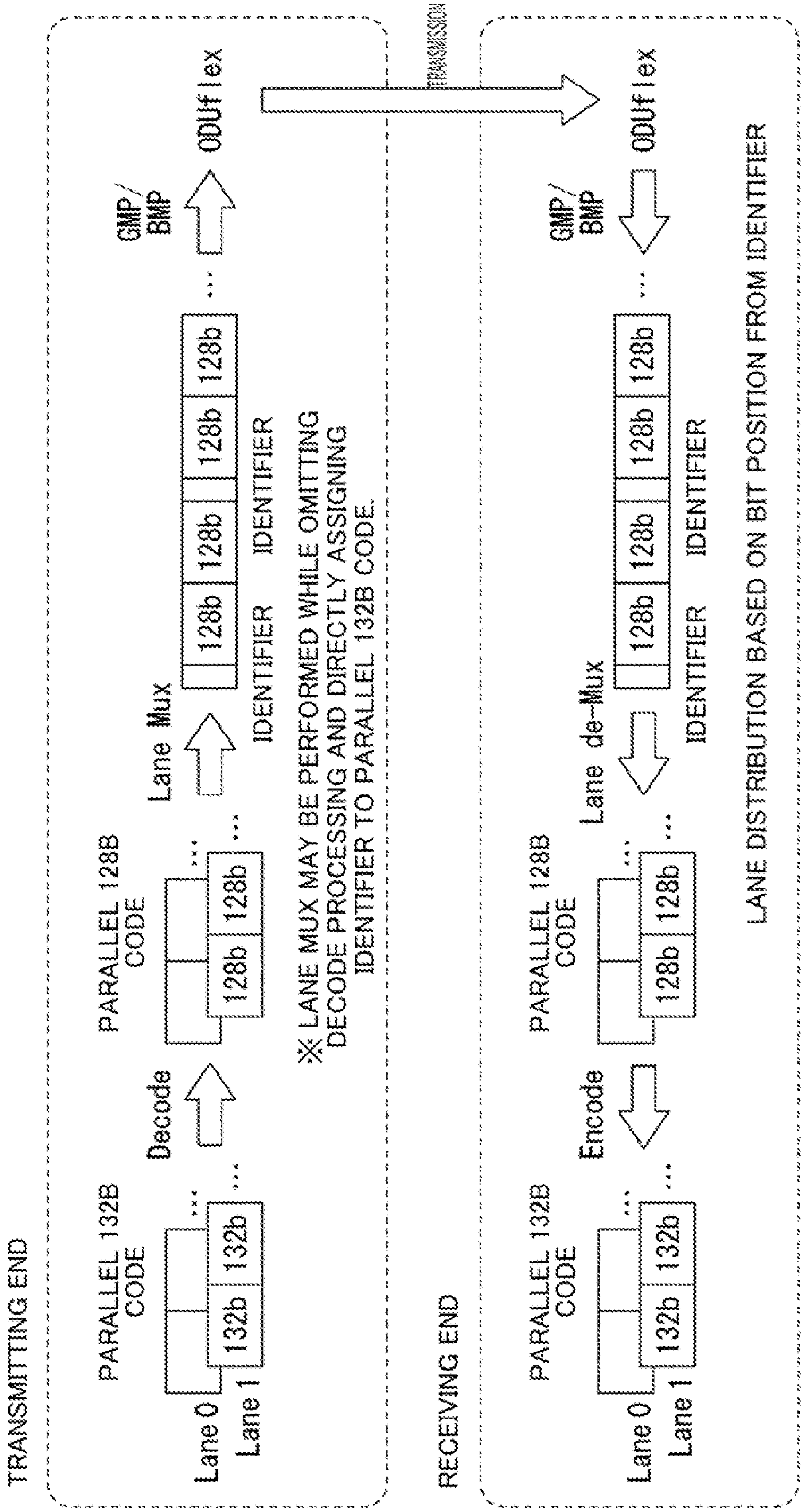
FIG. 5 is a diagram illustrating processing of a mapping method (1.1).

FIG. 5 is a diagram for explaining the processing of the mapping method (1.1). In the example shown in FIG. 5, the case of transcoding USB 3.2 (128*b*/132*b*, 10G×2 lanes) is shown as an example. As shown in FIG. 5, by assigning an identifier for identifying a lane and serializing the lane, the transmission device at the receiving end can easily parallelize the lane.

(Mapping Method (1.2))

Figure 6:
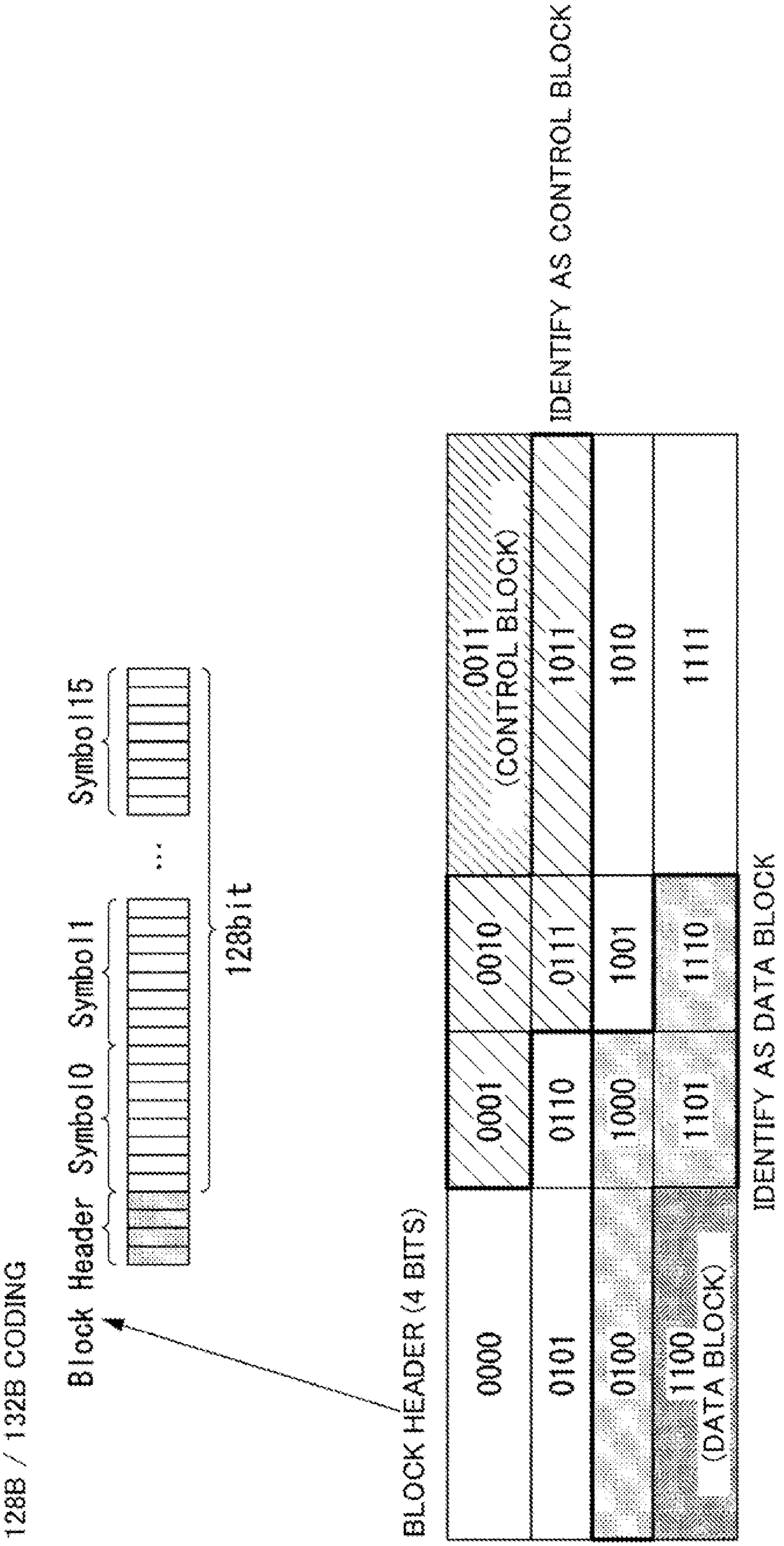
FIG. 6 is a diagram illustrating processing of a mapping method (1.2).
Figure 7:
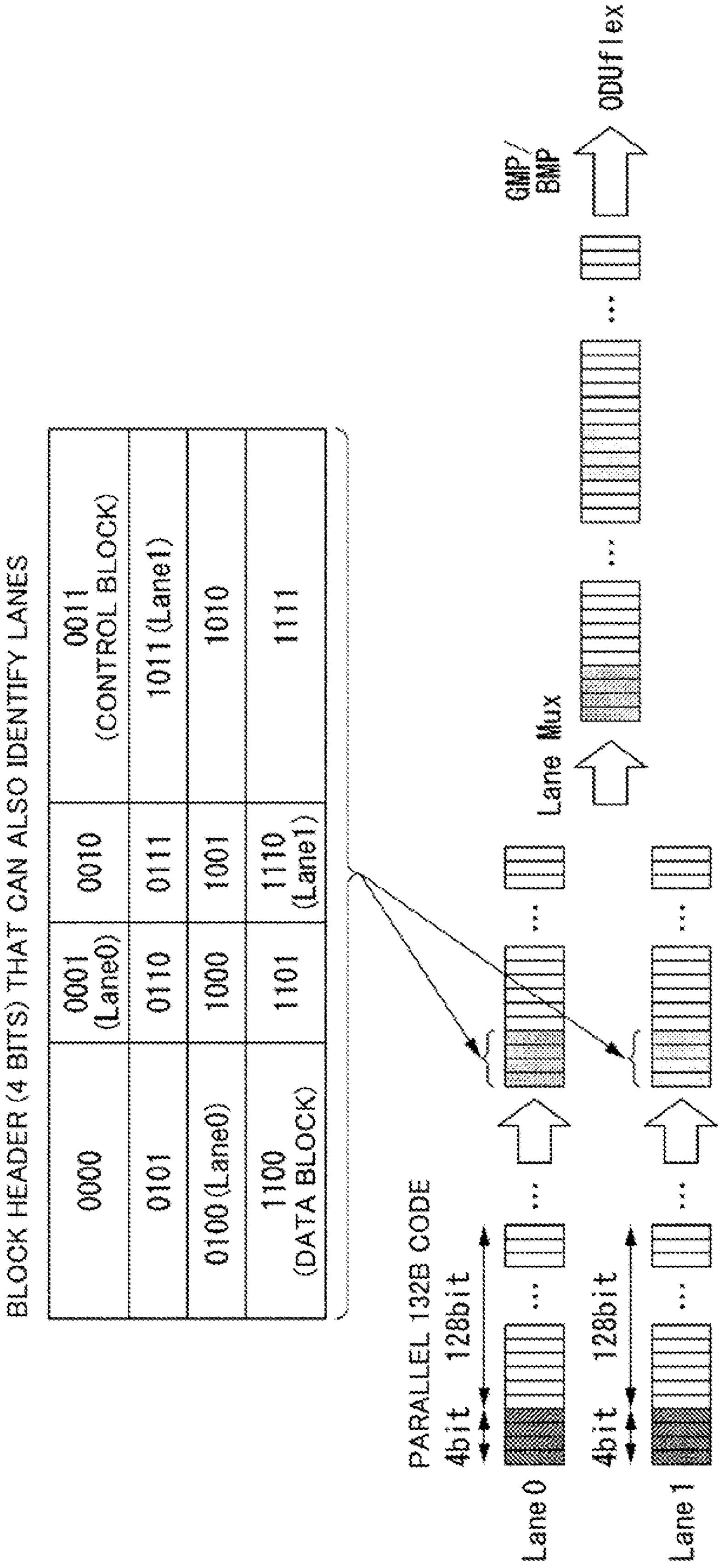
FIG. 7 is a diagram illustrating processing of a mapping method (1.2).

FIGS. 6 and 7 are diagrams for explaining the processing of the mapping method (1.2). FIG. 6 shows a case where a block header in a 132*b* code of USB 3.2 (128*b*/132*b*, 10G×2 lanes) is utilized as an example. As 128*b*/132*b* encode, a 4-bit block header is assigned to 8-bit×16 symbol. The block header identifies whether the block header is a data block or a control block. The block header has 1-bit error tolerance, for example, even when a block header of "0100" is received, it is processed as "1100 (data block)" at the receiving end.

FIG. 7 shows a case where a block header in a 132*b* code of USB 3.2 (128*b*/132*b*, 10G×2 lanes) is utilized as an example. In this method, a block header of 4 bits is utilized for lane identification. The transmitting end replaces the block header. For example, "0001" is replaced with a control block of Lane 0, "1011" is replaced with a control block of Lane 1, "0100" is replaced with a data block of Lane 0, and "1110" is replaced with a data block of Lane 1.

(Mapping Method (1.3))

Figure 8:
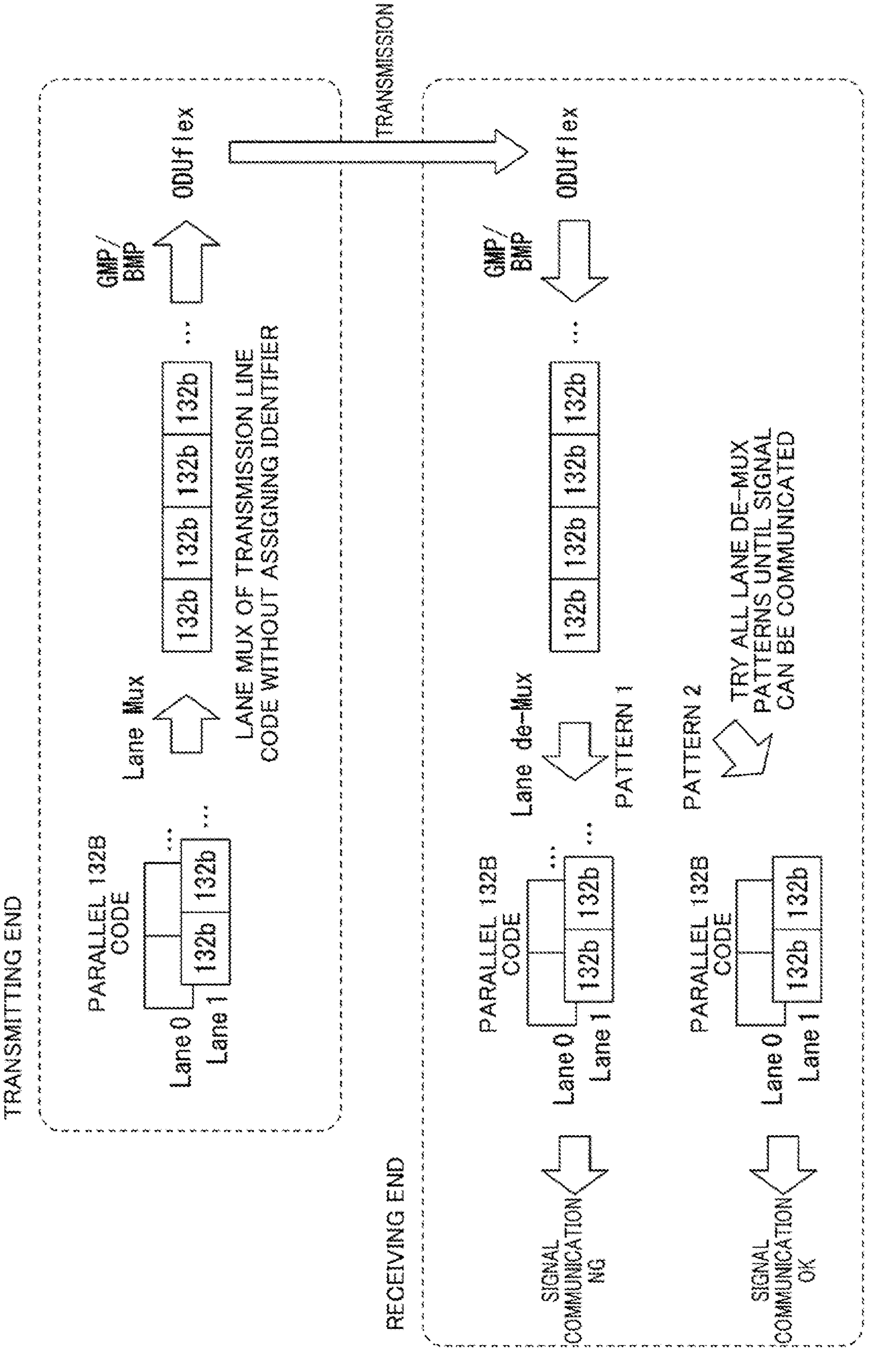
FIG. 8 is a diagram illustrating processing of a mapping method (1.3).

FIG. 8 is a diagram for explaining the processing of the mapping method (1.3). In the example shown in FIG. 8, unlike the mapping method (1.1), serialization is performed without assigning an identifier for identifying a lane. Then, the transmission device at the receiving end tries multi-lane formation per total until signals can be communicated.

(Mapping Method (2.1))

Figure 9:
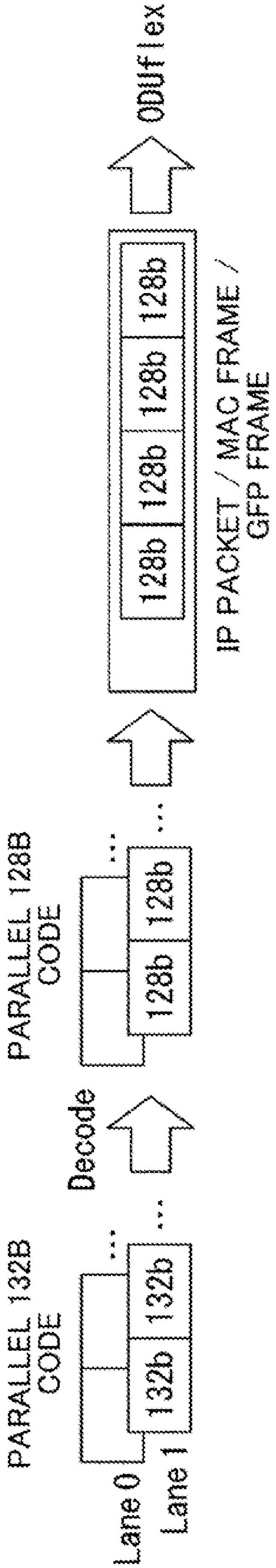
FIG. 9 is a diagram illustrating processing of a mapping method (2.1).

FIG. 9 is a diagram for explaining the processing of the mapping method (2.1). In the example shown in FIG. 9, the transmission device at the transmitting end once decodes the transmission line code and then encapsulates the transmission line code. IP packets (RFC2460), MAC frames (IEEE 802.3), GFP frames (ITU-T G. 7041) and the like can be used for encapsulation. In this way, the transmission device at the transmitting end maps and transmits the client signal.

(Mapping Method (2.2))

Figure 10:
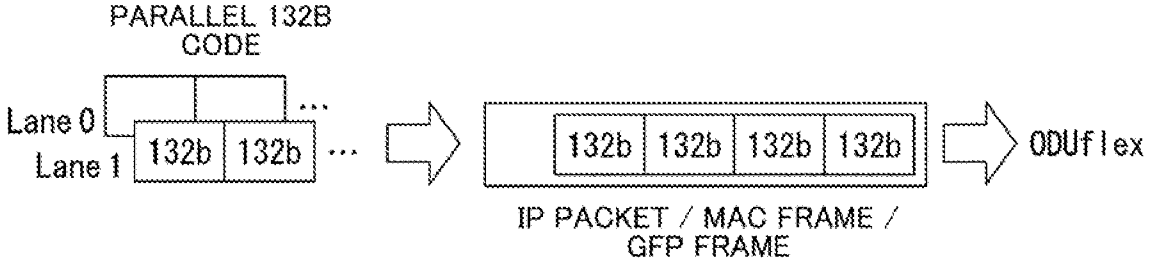
FIG. 10 is a diagram illustrating processing of a mapping method (2.2).

FIG. 10 is a diagram for explaining the processing of the mapping method (2.2). In the example shown in FIG. 10, the transmission device at the transmitting end encapsulates the transmission line code without decoding it. IP packets (RFC2460). MAC frames (IEEE 802.3), GFP frames (ITU-T G. 7041) and the like can be used for encapsulation. In this way, the transmission device at the transmitting end maps and transmits the client signal.

Figure 11:
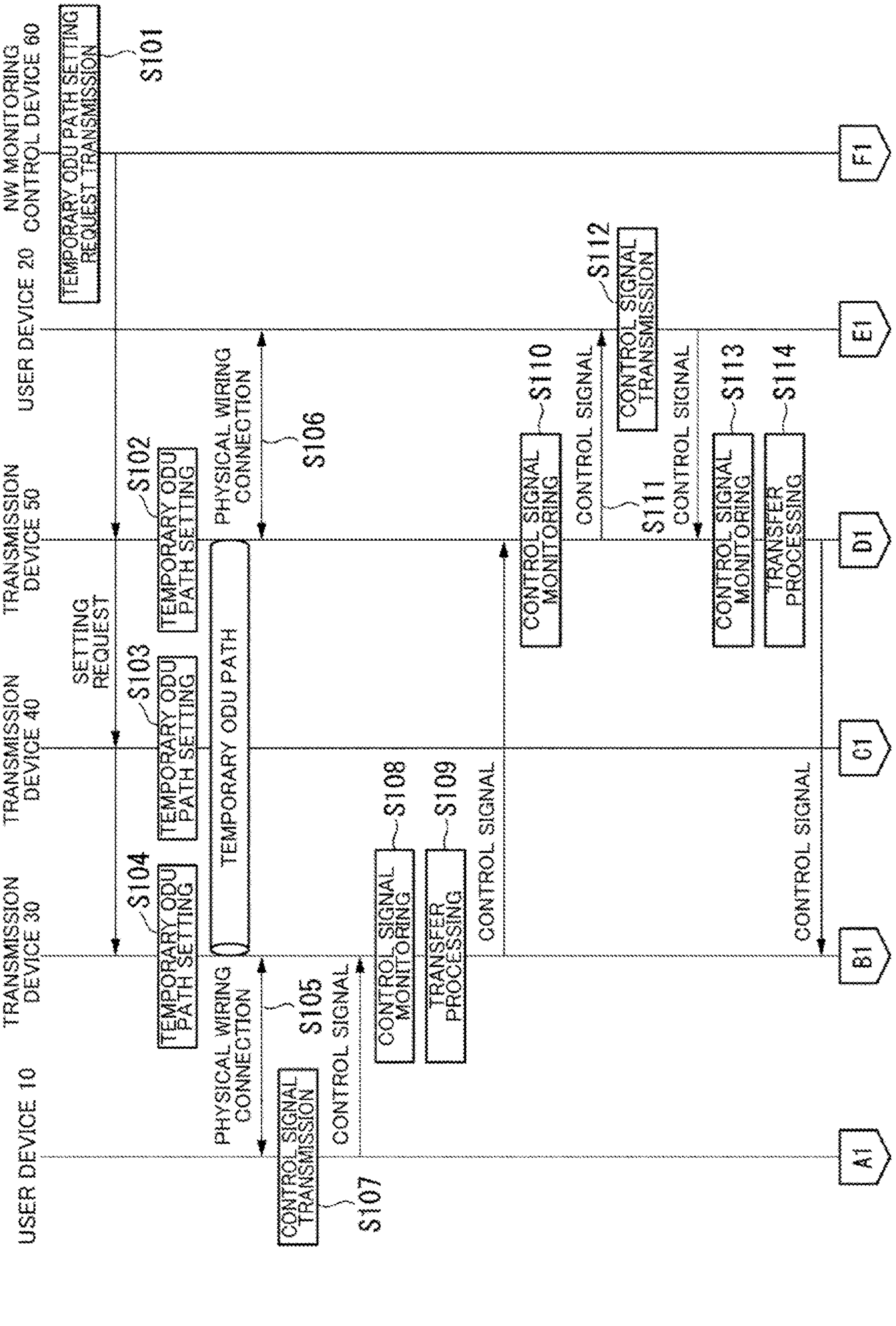
FIG. 11 is a sequence diagram showing a flow of processing of a transmission system according to the first embodiment.
Figure 12:
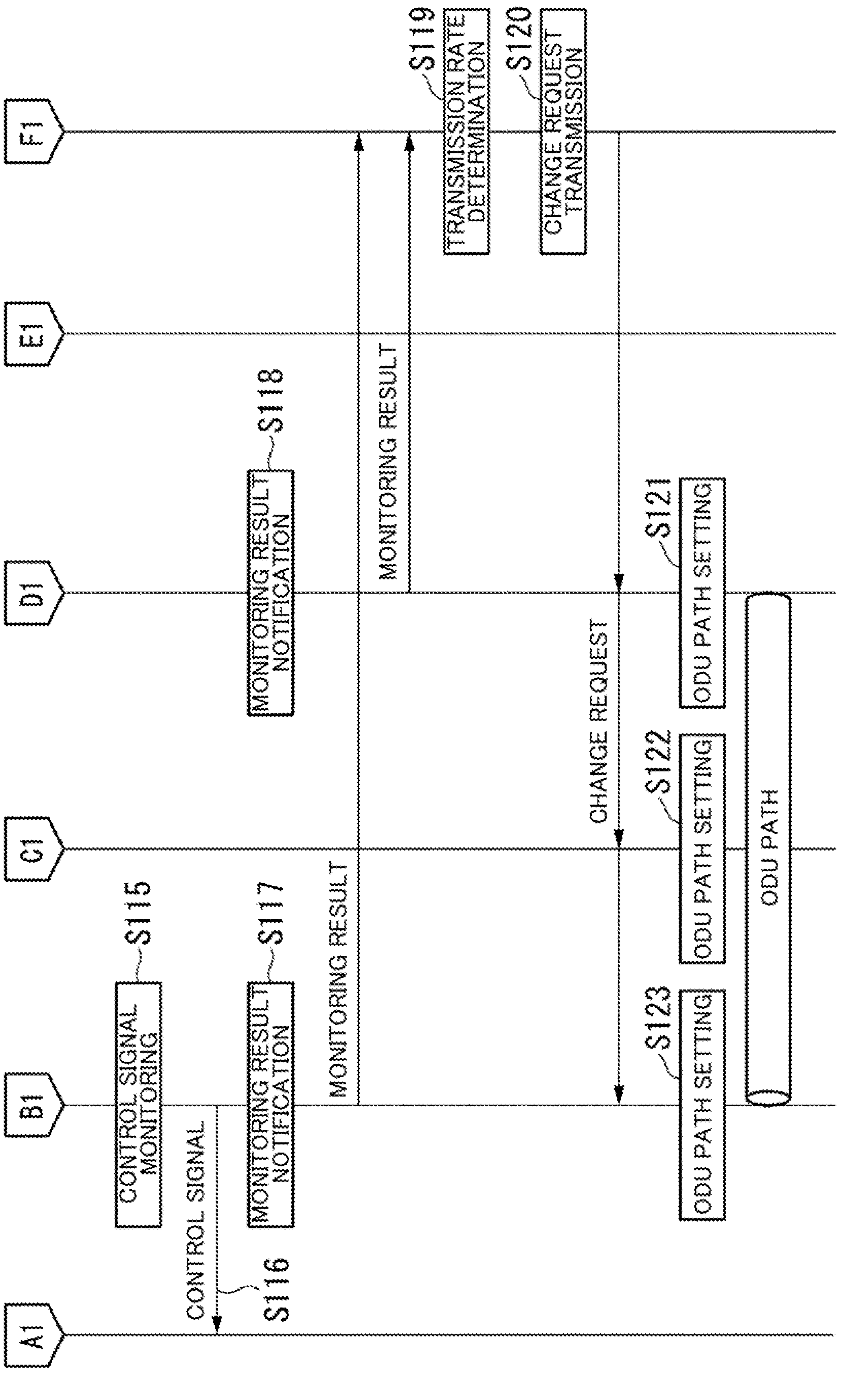
FIG. 12 is a sequence diagram (part 1) showing a flow of processing of a transmission system according to the first embodiment.

FIGS. 11 and 12 are sequence diagrams (part 1) illustrating a flow of processing of the transmission system 100 according to the first embodiment. FIGS. 11 and 12 describe a configuration in which the user devices 10 and 20 are connected to the transmission devices 30 and 50 after the temporary ODU path is established in the transmission devices 30, 40, and 50.

A setting request unit 621 of the NW monitoring control device 60 transmits a setting request of the temporary ODU path to the transmission devices 30, 40 and 50 (step S101). The temporary ODU path setting request includes information on the band of ODUflex. The transmission devices 30, 40 and 50 receive the setting request transmitted from the NW monitoring control device 60. The transmission devices 30, 40, and 50 set a temporary ODU path according to the received setting request (steps S102, S103, and S104).

Setting units 311, 412 and 511 of the transmission devices 30, 40 and 50 set a transmission rate of the ODUflex on the basis of information on a band of the ODUflex included in a setting request of the temporary ODU path. Furthermore, the setting units 311, 412 and 511 calculate the number of TSs on the basis of information on the band of ODUflex included in the setting request of the temporary ODU path and the transmission speed of the line signal. Setting units 311, 412 and 511 set the value of the calculated the number of TSs.

Thereafter, it is assumed that the user device 10 is physically connected to the transmission device 30 by wiring (step S105), and the user device 20 is physically connected to the transmission device 50 by wiring (step S106). The signal generation unit 11 of the user device 10 generates a control signal.

The signal generation unit 11 transmits the generated control signal to the transmission device 30 (step S107).

A client signal reception unit 301 of the transmission device 30 receives the control signal transmitted from the user device 10. A control signal monitor unit 310 monitors the control signal received by the client signal reception unit 301 (step S108).

The control signal monitor unit 310 outputs the control signal obtained from the client signal reception unit 301 to the ODUflexMap unit 302. Thereafter, the transmission device 30 transfers the control signal by any one of the transfer methods 1 to 3 described above (step S109). In the example shown in FIGS. 1I and 12, since the temporary ODU path is set, the transmission device 30 transfers the control signal to the transmission device 40 by (the control signal transfer method 1). The control signal is transferred to a transmission device 50 via a transmission device 40.

Figure 13:
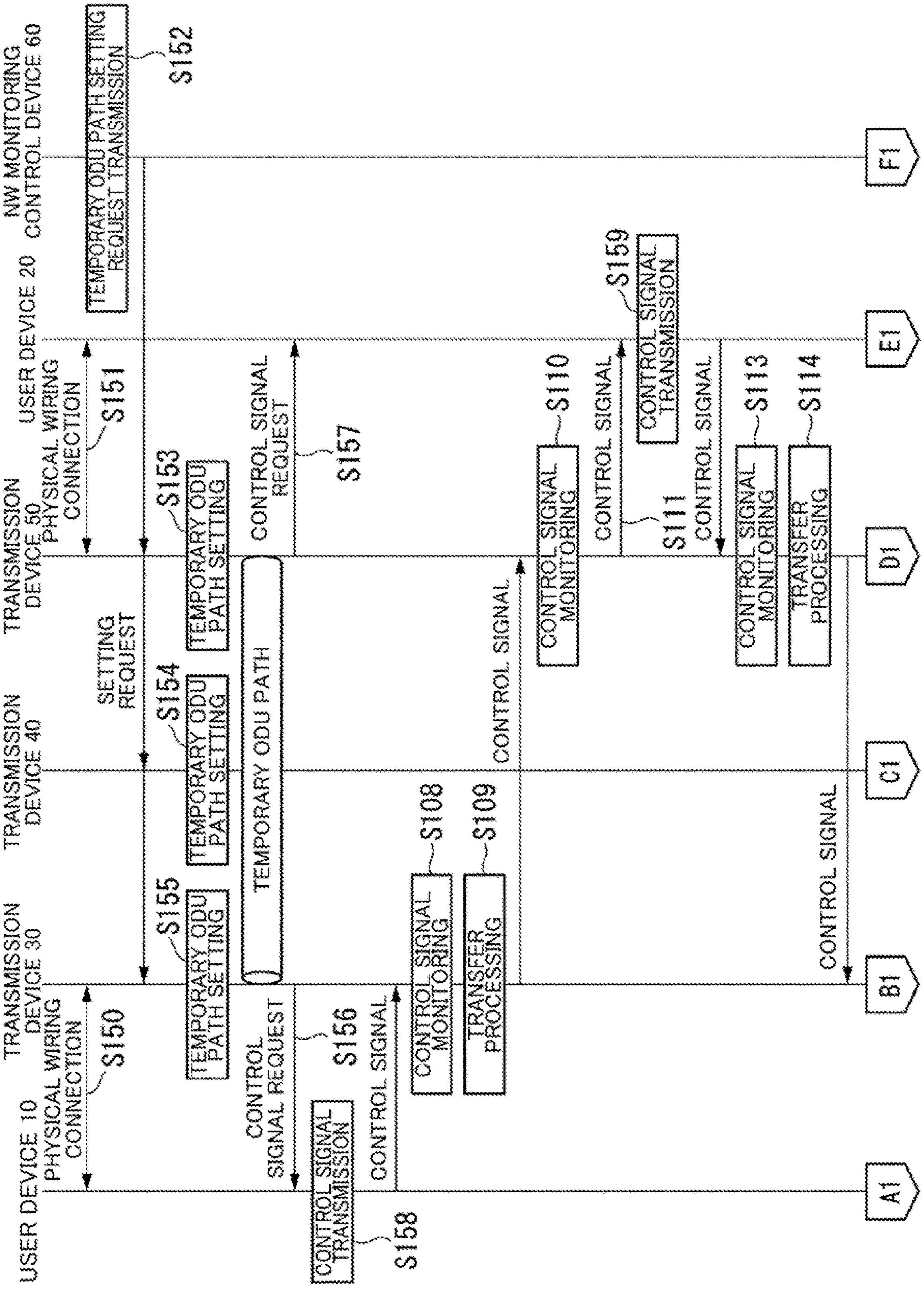
FIG. 13 is a sequence diagram (part 2) showing a flow of processing of a transmission system according to the first embodiment.

When there is no temporary ODU path setting request as shown in the processing of the step S101, the temporary ODU path is not set between the respective transmission devices 30, 40 and 50. In such a case, the transmission device 30 may transfer the control signal by any one of the control signal transfer method 2 and the control signal transfer method 3, or the transmission devices 30 and 50 may request the user devices 10 and 20 to transmit the control signal after the temporary ODU path is set as illustrated in FIG. 13, thereby starting negotiation. In this case, the processing shown in FIG. 13 is executed instead of FIG. 11. The processing illustrated in FIG. 13 will be described later.

A line signal reception unit 501 of the transmission device 50 receives the control signal transmitted from the transmission device 40. An ODUflexDe-Map unit 503 of the transmission device 50 extracts a control signal. A control signal monitor unit 510 monitors the control signal taken out by the ODUflexDe-Map unit 503 (step S110). The control signal monitor unit 510 outputs the control signal obtained from the ODUflexDe-Map unit 503 to the Client signal transmission unit 504. A Client signal transmission unit 504 transmits a control signal to the user device 20 (step S111).

A signal generation unit 21 of the user device 20 generates a control signal. The signal generation unit 21 transmits the generated control signal to a transmission device 50 (step S112). A client signal reception unit 505 of the transmission device 50 receives the control signal transmitted from the user device 20. A control signal monitor unit 510 monitors the control signal received by the client signal reception unit 505 (step S113).

The control signal monitor unit 510 outputs the control signal obtained from the client signal reception unit 505 to the ODUflexMap unit 506. The transmission device 50 performs transfer processing of the control signal (step S114). In the example shown in FIGS. 11 and 12, since the temporary ODU path is set, the transmission device 50 transfers the control signal by (the control signal transfer method 1).

A line signal reception unit 305 of the transmission device 30 receives a signal transmitted from the transmission device 40. An ODUflexDe-Map unit 307 of the transmission device 30 extracts a control signal. A control signal monitor unit 310 monitors the control signal taken out by the ODUflexDe-Map unit 307 (step S115). The control signal monitor unit 310 outputs the control signal obtained from the ODUflexDe-Map unit 307 to the Client signal transmission unit 308. A client signal transmission unit 308 transmits a control signal to the user device 10 (step S116).

A control signal monitor unit 310 of the transmission device 30 notifies an NW monitoring control device 60 of a monitoring result (step S117). Specifically, the control signal monitor unit 310 notifies the NW monitoring control device 60 of a monitoring result which is a result of handshake between a control signal transmitted from the user device 10 and a control signal transmitted from the user device 20.

A control signal monitor unit 510 of the transmission device 50 notifies an NW monitoring control device 60 of a monitoring result (step S118). Specifically, the control signal monitor unit 510 notifies the NW monitoring control device 60 of a monitoring result which is a result of handshake between a control signal transmitted from the user device 10 and a control signal transmitted from the user device 20.

By processing in steps S117 and S118, a communication unit 61 of the NW monitoring control device 60 receives a monitoring result from each of the two transmission devices 30 and 50. A determination unit 622 determines a transmission rate and a transmission system by using the received monitoring result and the control table stored in the storage unit 63 (step S119). The communication unit 61 transmits a change request including information on the determined transmission rate and transmission system to each of the transmission devices 30, 40 and 50 (step S120).

The transmission devices 30, 40 and 50 receive the change request transmitted from the NW monitoring control device 60. Setting units 311, 412 and 511 of the transmission devices 30, 40 and 50 set an ODU path according to the change request (steps S121. S122 and S123). Thereafter, the client signal is transmitted and received between the user device 10 and the user device 20.

Next, with reference to FIG. 13, after the temporary ODU path is set, the transmission devices 30, 50 request the user devices 10, 20 to transmit control signals, a configuration for urging the start of negotiation will be described. FIG. 13 is a sequence diagram (part 2) showing the flow of processing of the transmission system 100 in the first embodiment. Note that in FIG. 13, the same processes as those in FIG. 11 are denoted by the same reference numerals as those in FIG. 11, and description thereof will be omitted.

It is assumed that the user device 10 is physically connected to the transmission device 30 by wiring (step S150), and the user device 20 is physically connected to the transmission device 50 by wiring (step S151). Thereafter, the setting request unit 621 of the NW monitoring control device 60 transmits a setting request of the temporary ODU path to the transmission devices 30, 40, and 50 (step S152). The transmission devices 30, 40, and 50 receive the setting request transmitted from the NW monitoring control device 60. The transmission devices 30, 40, and 50 set the temporary ODU path in accordance with the received setting request (steps S153, S154, and S155).

The transmission device 30 transmits a transmission request of a control signal to the user device 10 after the temporary ODU path is extended (step S156). The user device 10 receives a transmission request of the control signal transmitted from the transmission device 30. The transmission device 50 transmits a transmission request of a control signal to the user device 20 after the temporary ODU path is established (step S157). The user device 20 receives a transmission request of the control signal transmitted from the transmission device 50.

A signal generation unit 1I of the user device 10 generates a control signal in response to reception of a transmission request of the control signal transmitted from the transmission device 30. The signal generation unit 11 transmits the generated control signal to a transmission device 30 (step S158). Subsequently, processing from step S108 to step S111 is executed.

A signal generation unit 21 of the user device 20 generates a control signal in response to reception of a transmission request of the control signal transmitted from the transmission device 50. The signal generation unit 21 transmits the generated control signal to a transmission device 50 (step S159). In FIG. 13, for convenience of explanation, the timing at which the user device 20 transmits the control signal is set to be the timing at which the user device 20 transmits the control signal, after receiving the control signal transmitted from the user device 10, and after receiving the transmission request of the control signal transmitted from the transmission device 50, the user device 20 may transmit the control signal at any timing as long as it is after receiving the transmission request of the control signal transmitted from the transmission device 50. For example, the user device 20 may transmit the control signal before processing of the step S108 after receiving the transmission request of the control signal transmitted from the transmission device 50.

According to the transmission system 100 constructed as described above, the transmission devices 30 and 50 monitor the control signals transmitted for negotiation between the user device 10 and the user device 20. Then, the transmission devices 30, 40 and 50 set the transmission rate of the ODU path obtained on the basis of the monitoring result. Thus, only by connecting the user device 10 and the user device 20 to the transmission device, the band of the ODU path suitable for signal communication can be automatically set. Thus, the setting change of the ODU path of the transmission device by the communication carrier is not required, and promptly signal communication is enabled.

For the sake of explanation, in FIG. 12, the control signals between the user device 10 and the user device 20 are exchanged for only one round, but negotiation by a plurality of round trip of the control signals may be used. In a case where the NW monitoring control device 60 is configured in this manner, the transmission rate and the transmission system of the transmission devices 30, 40, and 50 may be determined based on the control signals for a plurality of times. Further, as illustrated in FIG. 12, not only the control signals between the user device 10 and the user device 20 may be sequentially transmitted, but also the control signals from the user device 10 to the user device 20 and the control signals from the user device 20 to the user device 10 may be transmitted and received simultaneously.

Variant Example in First Embodiment

In the processing of the step S120 of FIG. 12, the communication unit 61 of the NW monitoring control device 60 transmits a change request including information on the determined transmission rate and transmission system to all the transmission devices 30, 40 and 50, but the present invention is not limited thereto. For example, the communication unit 61 may be configured to transmit a change request to the transmission devices 30 and 50, and either the transmission device 30 or 50 notifies the transmission device 40 of the change request.

Second Embodiment

In the first embodiment, some of the transmission devices monitor the control signals, and the NW monitoring control device determines the transmission rates and transmission systems of all the transmission devices. In the second embodiment, a configuration in which all the transmission devices monitor control signals and determine the transmission rate and transmission system in each transmission device will be described.

Figure 14:
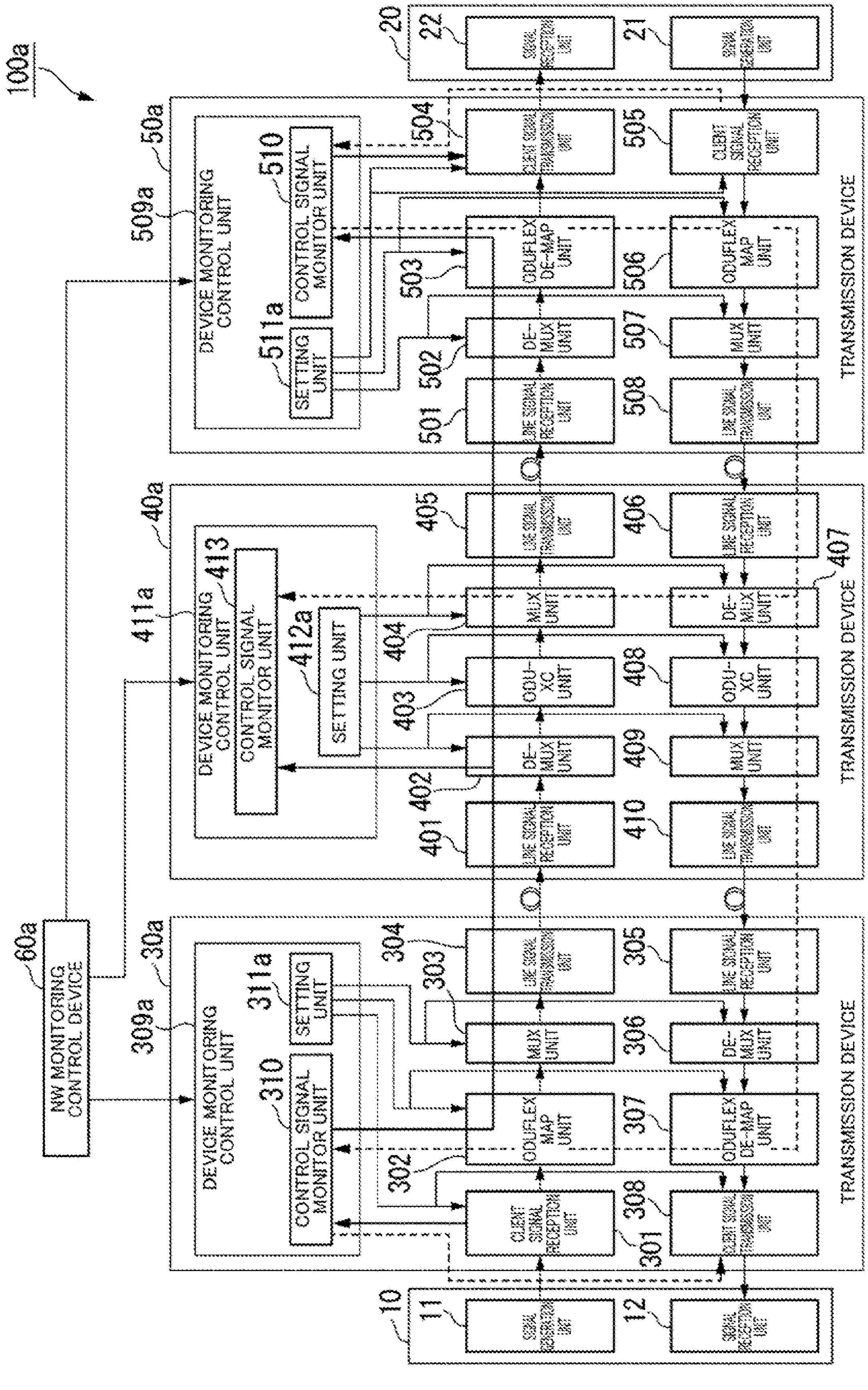
FIG. 14 is a diagram showing a configuration of a transmission system according to a second embodiment.

FIG. 14 is a diagram illustrating a configuration of a transmission system 100*a* in the second embodiment. The transmission system 100*a* includes a user device 10, a user device 20, a transmission device 30*a*, a transmission device 40*a*, a transmission device 50*a* and an NW monitoring control device 60*a* are provided. The transmission system 100*a* is different from the transmission system 100 in that the configuration of the transmission device 30*a*, the transmission device 40*a*, the transmission device 50*u* and the NW monitoring control device 60*a* is different. The following describes the difference.

Unlike the NW monitoring control device 60 in the first embodiment, the NW monitoring control device 60*a* does not determine the transmission rate based on the monitoring result. That is, the NW monitoring control device 60*a* does not include a determination unit 622 and a storage unit 63. For other configurations, the NW monitoring control device 60*a* performs the same processing as the NW monitoring control device 60.

In the transmission system 100*a* in the second embodiment, all the transmission devices 30*a*, 40*a* and 50*a* are provided with a control signal monitor unit for monitoring a control signal. Control signal monitor units 310, 413 and 510 provided in the respective transmission devices 30*a*, 40*a* and 50*a* do not transmit the monitoring result to the NW monitoring control device 60*a*.

Further, setting units 311*a*. 412*a* and 511*a* included in the transmission devices 30*a*, 40*a* and 50*a* include the function of a determination unit 622 in addition to the processing in the first embodiment. That is, the setting units 311*a*, 412*a* and 511*a* determine the transmission rate and the transmission system on the basis of the monitoring result. Setting units 311*a*, 412*a* and 511*a* set the determined transmission rate and the number of TSs based on the transmission rate.

Figure 15:
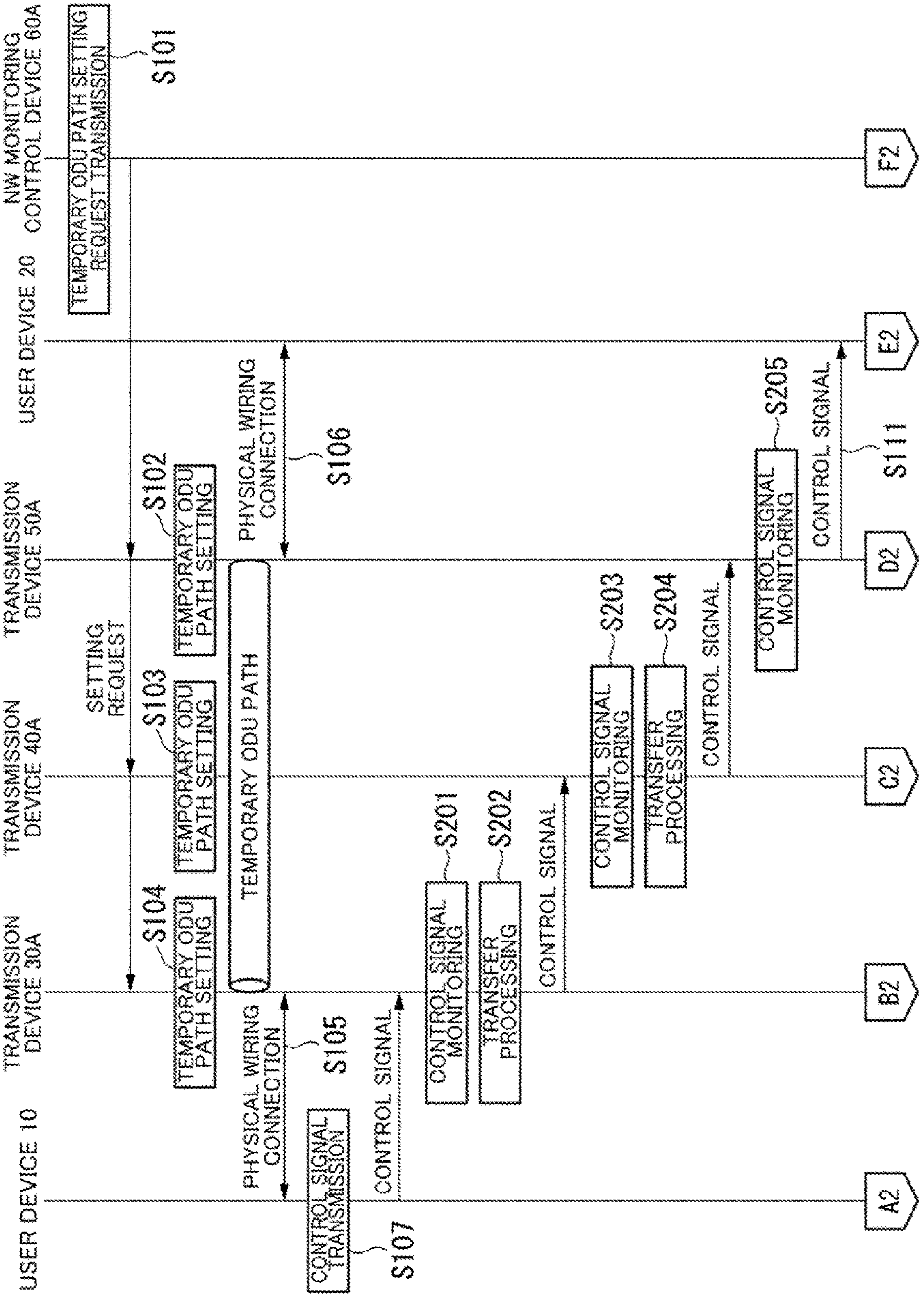
FIG. 15 is a sequence diagram showing a flow of processing of a transmission system according to the second embodiment.
Figure 16:
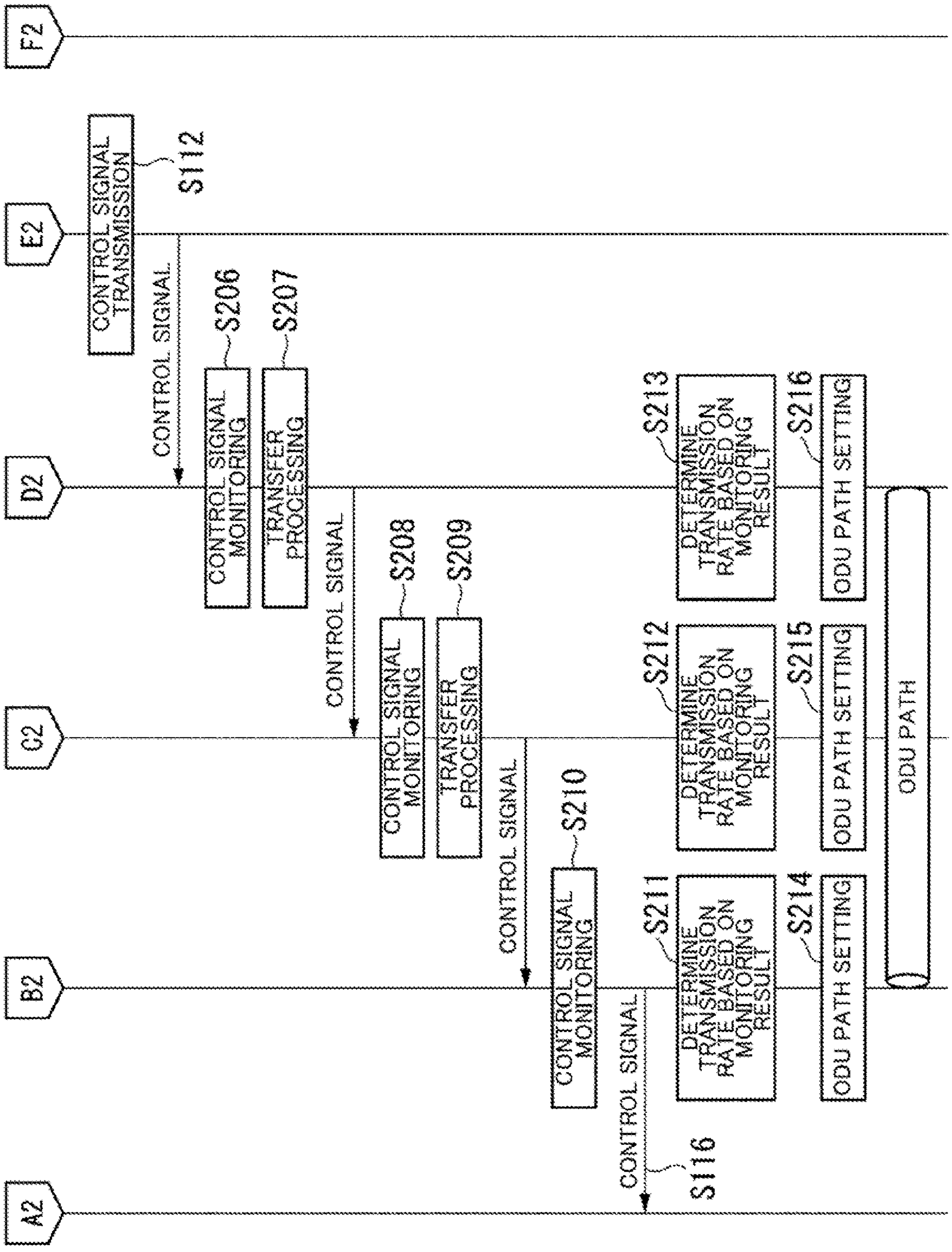
FIG. 16 is a sequence diagram showing a flow of processing of a transmission system according to the second embodiment.

FIGS. 15 and 16 are sequence diagrams illustrating a flow of processing of the transmission system 100*a* in the second embodiment. In FIGS. 15 and 16, the same processes as those in FIGS. 11 and 12 are denoted by the same reference numerals as those in FIGS. 11 and 12, and the description thereof will be omitted.

When processing from the step S101 to the step S107 is performed, a client signal reception unit 301 of the transmission device 30*a* receives the control signal transmitted from the user device 10. A control signal monitor unit 310 monitors the control signal received by the client signal reception unit 301 (step S201). A control signal monitor unit 310 outputs the monitoring result to a setting unit 311*a*.

The control signal monitor unit 310 outputs the control signal obtained from the client signal reception unit 301 to the ODUflexMap unit 302. Thereafter, the transmission device 30*a* transfers the control signal by any of the transfer methods 1 to 3 described above (step S202). In the examples shown in FIGS. 15 and 16, since the temporary ODU path is set, the transmission device 30*a* transfers the control signal to the transmission device 40*a* by (control signal transfer method 1).

A line signal reception unit 401 of the transmission device 40*a* receives the control signal transmitted from the transmission device 30*a*. A De-Mux unit 402 separates one or more ODUflex from the ODU received by the line signal reception unit 401. Thus, the control signal is separated.

A control signal monitor unit 413 monitors the control signal separated by the De-Mux unit 402 (step S203). A control signal monitor unit 413 outputs the monitoring result to a setting unit 412*a*. Thereafter, the transmission device 40*a* transfers the control signal to the transmission device 50*a* by any one of the methods 1 to 3 (step S204).

A line signal reception unit 501 of the transmission device 50*a* receives the control signal transmitted from the transmission device 40*a*. An ODUflexDe-Map unit 503 of the transmission device 50*a* extracts a control signal. A control signal monitor unit 510 monitors the control signal taken out by the ODUflexDe-Map unit 503 (step S205). A control signal monitor unit 510 outputs the monitoring result to a setting unit 511*a*. The control signal monitor 510 outputs the control signal obtained from the ODUflexDe-Map unit 503 to the client signal transmission unit 504. A client signal transmission unit 504 transmits a control signal to the user device 20 (step S111).

A signal generation unit 21 of the user device 20 generates a control signal. The signal generation unit 21 transmits the generated control signal to a transmission device 50*a* (step S112). A client signal reception unit 505 of the transmission device 50*a* receives the control signal transmitted from the user device 20. A control signal monitor unit 510 monitors the control signal received by the client signal reception unit 505 (step S206). A control signal monitor unit 510 outputs the monitoring result to a setting unit 511*a*.

The control signal monitor unit 510 outputs the control signal obtained from the client signal reception unit 505 to the ODUflexMap unit 506. The transmission device 50*a* performs transfer processing of the control signal (step S207). In the examples shown in FIGS. 11 and 12, since the temporary ODU path is set, the transmission device 50*a* transfers the control signal to the transmission device 40*a* by (control signal transfer method 1).

A line signal reception unit 406 of the transmission device 40*a* receives the control signal transmitted from the transmission device 50*a*. A De-Mux unit 407 separates one or more ODUflex from the ODU received by the line signal reception unit 406. Thus, the control signal is separated. A control signal monitor unit 413 monitors the control signal separated by the De-Mux unit 407 (step S208). A control signal monitor unit 413 outputs the monitoring result to a setting unit 412*a*. Thereafter, the transmission device 40*a* transfers the control signal to the transmission device 30*a* by any of the transfer methods 1 to 3 described above (step S209).

A line signal reception unit 305 of the transmission device 30*a* receives the control signal transmitted from the transmission device 40*a*. An ODUflexDe-Map unit 307 of the transmission device 30*a* extracts a control signal. A control signal monitor unit 310 monitors the control signal taken out by the ODUflexDe-Map unit 307 (step S210). A control signal monitor unit 310 outputs the monitoring result to a setting unit 311*a*. The control signal monitor 310 outputs the control signal obtained from the ODUflexDe-Map unit 307 to the client signal transmission unit 308. A client signal transmission unit 308 transmits a control signal to the user device 10 (step S116).

The setting unit 311*a* of the transmission device 30*a* determines the transmission rate and the transmission method using the obtained plurality of monitoring results and the control table (step S211). A setting unit 412*a* of the transmission device 40*a* determines a transmission rate and a transmission system using the obtained plurality of monitoring results and a control table (step S212). A setting unit 511*a* of the transmission device 50*a* determines a transmission rate and a transmission system using the obtained plurality of monitoring results and a control table (step S213).

Setting units 311*a*, 412*a* and 511*a* set an ODU path on the basis of the determined transmission rate (steps S214. S215 and S216). Thereafter, the client signal is transmitted and received between the user device 10 and the user device 20.

According to the transmission system 100*a* configured as described above, it is possible to obtain the same effect as that of the first embodiment.

In the transmission system 100, only the initial temporary ODU path is set by the NW monitoring control device 60*a*, and the setting of the respective transmission devices 30*a*, 40*a* and 50S thereafter is autonomously performed. Thus, only by connecting the user device 10 and the user device 20 to the transmission device, the band of the ODU path suitable for signal communication can be automatically set. Thus, the setting change of the ODU path of the transmission device by the communication carrier is not required, and promptly signal communication is enabled.

Variant Example in Second Embodiment

In the transmission system 100*a*, similarly to the first embodiment, the transmission devices 30*a* and 50*a* may be set to prompt the user devices 10 and 20 to start negotiation by requesting the user devices 10 and 20 to transmit a control signal after the temporary ODU path is configured.

For convenience of description, in FIG. 16, the control signals between the user device 10 and the user device 20 are exchanged only for one round-trip, but negotiation may be performed by round-trip of the control signals a plurality of times. In such a configuration, each of the transmission devices 30*a*, 40*a* and 50*a* may determine the transmission rate and transmission system of the transmission devices 30*a*. 40*a* and 50*a* on the basis of a plurality of times of control signals. Further, as illustrated in FIG. 16, not only the control signals between the user device 10 and the user device 20 may be sequentially transmitted, but also the control signals from the user device 10 to the user device 20 and the control signals from the user device 20 to the user device 10 may be transmitted and received simultaneously.

Some functional parts of the transmission devices 30, 30*a*, 40, 40*a*, 50, 50*a* in the embodiments described above may be realized by a computer. In such a case, the program for realizing this function may be recorded on a computer-readable recording medium, and the program recorded on the recording medium may be read and executed by the computer system. The "computer system" recited herein includes an OS and hardware such as peripheral devices.

In addition, a "computer-readable recording medium" refers to a portable medium such as a flexible disk, a magneto-optical disk, a ROM, or a CD-ROM, or a storage device such as a hard disk built in a computer system. Furthermore, the "computer-readable recording medium" may include a medium that dynamically holds a program for a short time, such as a communication line in a case where the program is transmitted via a network such as the Internet or a communication line such as a telephone line, and a medium that holds the program for a certain time, such as a volatile memory inside a computer system serving as a server or a client in that case. Also, the above program may be for realizing a part of the functions described above, may be for realizing the functions described above in combination with a program already recorded in a computer system, or may be for realizing the functions described above using a programmable logic device such as an FPOA.

Although the embodiment of the present invention has been described in detail with reference to the drawings, a specific configuration is not limited to this embodiment, and design within the scope of the gist of the present invention, and the like are included.

INDUSTRIAL APPLICABILITY

The present invention can be applied to a multiplex accommodation technique of an optical transmission network.

REFERENCE SIGNS LIST

10, 20 User device
11, 21 Signal generation unit

12, 22 Signal reception unit
30, 30*a*, 40, 40*a*. 50, 50*a* Transmission device
60, 60*a* NW monitoring control device
61 Communication unit
62 Control unit
63 Storage unit
301, 505 Client signal reception unit
302, 506 ODUflexMap unit
303, 404, 409, 507 Mux unit
304, 405, 410, 508 Line signal transmission unit
305, 401, 406, 501 Line signal reception unit
306, 402, 407, 502 De-Mux unit
307, 503 ODUflexDe-Map unit
308, 504 Client signal transmission unit
309, 411, 509 Device monitoring control unit
310, 510 Control signal monitor unit
311, 312*a*, 412.412*a*, 511, 511*a* Setting unit
403, 408 ODU-XC unit
621 Setting request unit
62 Control unit

The invention claimed is:

1. A transmission device, which is provided between user devices and transmits a client signal transmitted by the user devices through an optical transmission network, the transmission device comprising:

a setter configured to set a path having a band for accommodating the client signal based on transmission rate determined from a monitoring result of a control signal transmitted and received at a time of negotiation between the user devices; and a transferer configured to transfer the client signal using the path set by the setter.

2. The transmission device according to claim 1, further comprising a control signal monitor configured to monitor the control signal transmitted from each user device, wherein the control signal monitor notifies a monitoring control device that controls the transmission device of a monitoring result, and the setter sets a path having a band for accommodating the client signal determined by the monitoring control device.

3. The transmission device according to claim 1, further comprising a control signal monitor that monitors the control signal transmitted from each user device, wherein the setter determines a band to accommodate the client signal using a monitoring result obtained by the control signal monitor, and sets a path having the determined band.

4. The transmission device according to claim 1, wherein the setter sets a temporary path for the negotiation, and sets again a path having a band for accommodating the client signal obtained from a monitoring result of the control signal.

5. The transmission device according to claim 1, wherein the transferer maps and transfers a client signal by superimposing a lane identifier in a transmission line code.

6. The transmission device according to claim 1, wherein the setter sets the number of ODUflexs and TSs (Tributary Slots) in accordance with a speed of the client signal to be accommodated.

7. A path setting method in a transmission device provided between user devices and transmits a client signal transmitted by the user devices through an optical transmission network, the path setting method comprising:

setting a path having a band for accommodating the client signal based on transmission rate determined from a monitoring result of a control signal transmitted and received at a time of negotiation between the user devices; and transferring the client signal using the set path.

8. A non-transitory computer readable storage medium that stores a computer program to be executed by the computer to function as a transmission device, which is provided between user devices and transmits a client signal transmitted by the user devices through an optical transmission network;

setting a path having a band for accommodating the client signal based on transmission rate determined from a monitoring result of a control signal transmitted and received at a time of negotiation between the user devices; and transferring the client signal using the path set by the setting step.

* * * * *